US012798971B2

(12) United States Patent
Huang et al.

(10) Patent No.: US 12,798,971 B2
(45) Date of Patent: Nov. 17, 2026

(54) METHOD, PRODUCT AND SYSTEM FOR COGENERATING FERRIC PHOSPHATE THROUGH NITROPHOSPHATE FERTILIZER DEVICE

(71) Applicants: Guizhou Batian Ecotypic Engineering Co., Ltd., Guizhou Province (CN); Shenzhen Batian Ecotypic Engineering Co., Ltd., Shenzhen City (CN)

(72) Inventors: Deming Huang, Guizhou Province (CN); Guojun Zhao, Guizhou Province (CN); Faan Liu, Shenzhen City (CN); Jin Fang, Guizhou Province (CN); Shiying Huang, Guizhou Province (CN); Jing Cheng, Guizhou Province (CN); Lingyun Zhang, Guizhou Province (CN); Junqiang Feng, Shenzhen City (CN); Jianqing Hua, Shenzhen City (CM)

(73) Assignees: Guizhou Batian Ecotypic Engineering Co., Ltd., Guizhou Province (CN); Shenzhen Batian Ecotypic Engineering Co., Ltd., Shenzhen City (CN)

( * ) Notice: Subject to any disclaimer, the term of this patent is extended or adjusted under 35 U.S.C. 154(b) by 661 days.

(21) Appl. No.: 18/209,343

(22) Filed: Jun. 13, 2023

(65) Prior Publication Data

US 2024/0417258 A1 Dec. 19, 2024

(30) Foreign Application Priority Data

Jun. 20, 2022 (CN) ........................ 202210698909.3

(51) Int. Cl.
*C01B 25/37* (2006.01)
*C05B 11/06* (2006.01)

(52) U.S. Cl.
CPC ............ *C01B 25/375* (2013.01); *C05B 11/06* (2013.01)

(58) Field of Classification Search
None
See application file for complete search history.

(56) References Cited

U.S. PATENT DOCUMENTS

2016/0060113 A1* 3/2016 Cohen ..................... C01B 25/32 422/187
2023/0399230 A1* 12/2023 Huang ................ C01B 25/2346

OTHER PUBLICATIONS

Gu et al.; CN102351590.*

* cited by examiner

*Primary Examiner* — Guinever S Gregorio
(74) *Attorney, Agent, or Firm* — Dentons Durham Jones Pinegar

(57) ABSTRACT

The present disclosure discloses a method, product, and system for cogenerating ferric phosphate through a nitrophosphate fertilizer device. The method comprises the steps of: acid-hydrolyzing phosphate rock with a nitric acid, and separating acid-insoluble substances to obtain an acid-hydrolyzed solution; freezing-crystallizing the acid-hydrolyzed solution, and carrying out solid-liquid separation to obtain a first solution; adding a solution containing sulfate ions to the first solution for reaction to obtain a second solution; subjecting the second solution to a denitrification to obtain a third solution; adding ammonia to the third solution for neutralization, and carrying out solid-liquid separation to obtain an ammonium phosphate solution, and adding an iron source to the ammonium phosphate solution for reaction to prepare a ferric phosphate. The present (Continued)

disclosure utilizes phosphate rock raw material to prepare a high-purity ferric phosphate, and by-product can be directly used for fertilizer preparation or as independent product, without waste.

6 Claims, 5 Drawing Sheets

METHOD, PRODUCT AND SYSTEM FOR COGENERATING FERRIC PHOSPHATE THROUGH NITROPHOSPHATE FERTILIZER DEVICE

CROSS-REFERENCE TO RELATED APPLICATION

This application claims priority under 35 U.S.C. § 119(a) to Chinese Patent Application No. 202210698909.3, filed on Jun. 20, 2022, which is hereby incorporated herein in its entirety.

TECHNICAL FIELD

The present disclosure relates to the technical field of the processing of phosphate rock, in particular to a method, a product, and a system for cogenerating ferric phosphate through a nitrophosphate fertilizer device.

BACKGROUND

The preparation of ferric phosphate generally uses the reaction of an iron source and a phosphorus source, i.e., the prepared iron source and phosphoric acid are used for the preparation of ferric phosphate. However, the present disclosure can achieve the preparation of ferric phosphate through two routes by using a nitrophosphate fertilizer device, wherein one route is to prepare ferric phosphate by preparing ammonium phosphate, and the other route is to prepare ferric phosphate by preparing phosphoric acid. Both routes fully utilize the nitrophosphate fertilizer device to prepare ferric phosphate.

SUMMARY

An embodiment of the present disclosure provides a method for cogenerating ferric phosphate through a nitrophosphate fertilizer device, comprising the following steps of:

- acid-hydrolyzing phosphate rock or phosphate concentrate with a nitric acid, and separating acid-insoluble substances to obtain an acid-hydrolyzed solution;
- freezing-crystallizing the acid-hydrolyzed solution and then carrying out solid-liquid separation to obtain a first solution;
- adding a solution containing sulfate ions to the first solution for decalcification to obtain a second solution A, and/or adding the first solution to a sulfuric acid for reaction, and then carrying out solid-liquid separation to obtain a second solution B;
- subjecting the second solution A and/or the second solution B to a denitrification to obtain a third solution A and/or a third solution B;
- adding ammonia to the third solution A for neutralization, and then carrying out solid-liquid separation to obtain an ammonium phosphate solution, and then adding an iron source to the ammonium phosphate solution for reaction to prepare ferric phosphate; and/or
- subjecting the third solution B to a pre-treatment and extraction by using an extractant to obtain an extract phase, and then subjecting the extract phase to a post-treatment and back-extraction to obtain a phosphoric acid solution, and then reacting the phosphoric acid solution with an iron source to obtain ferric phosphate;
- extracting the third solution B to remove metal ions to obtain a phosphoric acid solution.

In some embodiments, the acid-hydrolyzed solution is the liquid phase component obtained by directly filtering and separating the acid-hydrolyzed slurry. Alternatively, in some embodiments, the acid-hydrolyzed solution is obtained by merging the liquid phase component obtained by directly filtering and separating the acid-hydrolyzed slurry, and the scrubbing solution obtained by scrubbing the solid phase component of acid hydrolysis and separation with process water one or more times.

In some embodiments, the acid-hydrolyzed solution of the phosphate concentrate mainly contains phosphate ions, metal impurities including, for example, calcium ions and the like, nitrate ions obtained from the acid hydrolysis of nitric acid. In an embodiment, the amount of the added nitric acid during the process of acid hydrolysis can be relatively excessive to ensure complete reaction of the phosphate rock raw material.

In some embodiments, the acid-insoluble substances obtained from solid-liquid separation mainly contain salts of silicon, calcium, and magnesium. In an embodiment, in order to effectively utilize the elements contained in the acid-insoluble substances, the acid-insoluble substances obtained from acid hydrolysis can be prepared into soil conditioner products for soil improvement.

In some embodiments, the temperature for freezing-crystallization of the acid-hydrolyzed solution ranges from −10° C. to −5° C., and within this temperature range, 60-85% of calcium nitrate precipitates in the form of $Ca(NO_3)_2 \cdot 4H_2O$ crystalline. Then, the frozen solution is filtered to promote the condensation and precipitation of crystalline to obtain the first solution which is removed impurities such as calcium for the first time.

In another embodiment, the acid-hydrolyzed solution is frozen to a temperature of −8° C. to −5° C., and is then directly fed into a double drum filter for filtration and separation. The liquid phase component obtained after filtration is the first solution.

Alternatively, in specific details of an embodiment, the solid phase component obtained after filtration and separation, such as the filter cake obtained through filtration, is scrubbed with chilled nitric acid and chilled water. A portion of the generated scrubbing solution is recycled and merged into the acid-hydrolyzed solution for further freezing-crystallization and separation. The other portion of the scrubbing solution is added to the acid hydrolysis tank for acid hydrolysis.

In some embodiments, the solution containing sulfate ions, such as at least one of sulfuric acid or ammonium sulfate, is added to the first solution.

In a further embodiment, the amount of the solution containing the sulfate ions is not excessive to avoid introducing sulfate impurities. That is to say, the molar amount of the added sulfate ions should not exceed the molar amount of the calcium ions in the first solution to prevent the presence of the sulfate ions that affect the quality of phosphoric acid in the second solution A after decalcification.

In another embodiment, the amount of the solution containing the sulfate ions is not excessive, and maintaining the concentration of the sulfate ions in the second solution below 0.5% after decalcification is beneficial for the subsequent removal of impurities. In another embodiment, the concentration of the sulfate ions in the second solution is maintained below 0.1% after decalcification. The concentration of the sulfate ions in the second solution may even be maintained below 0.01% after decalcification.

In an embodiment, the second solution A or the second solution B is subjected to denitrification treatment by evaporating and concentrating the second solution to remove nitric acid.

In an embodiment, the evaporation temperature for evaporating and concentrating the second solution to remove the nitric acid is adjustable between 70° C. to 90° C. (vacuum degree 10-15 kpa). In another embodiment, the temperature for removing the nitric acid by evaporation and concentration is maintained at a temperature of 70° C. to 90° C. When the concentration of the nitrate ions in the system is below 0.1%, it is beneficial for the subsequent removal of metal impurities and the generation of phosphoric acid. Furthermore, in another embodiment, the concentration of the nitrate ions in the system is below 0.05% by evaporation and concentration. The concentration of the nitrate ions in the system may even be below 0.01% by evaporation and concentration.

In an embodiment, the concentration of the nitrate ions contained in the third solution obtained by evaporating and concentrating the second solution to remove nitric acid is below 0.05%. The concentration of the nitrate ions contained in the third solution may even be below 0.01%.

In an embodiment, the above extraction is a multi-stage cross-flow extraction, so that the extraction efficiency is more sufficient.

The term "multi-stage cross-flow extraction" is a chemical term that refers to a method for carrying out multi-stage cross-flow extraction in a device with multiple stages connected in series, wherein each stage comprises an extraction chamber and a re-extraction chamber. In the extraction chamber, a donor phase is contact with an in extractant, which is re-extracted in contact with an acceptor phase in the re-extraction chamber. The extractant is conveyed in cross-flow to the donor phase and acceptor phase within the same stage in a suitable manner, while the donor phase and acceptor phase are conveyed through some or all of the stages in counter-current flow.

In an embodiment, the method further comprises the steps of:

back-extracting the extract phase obtained by extraction, and then separating to obtain phosphoric acid and the extractant that can be recycled for extraction.

In an embodiment, the extractant comprises at least one of n-butanol, isoamyl alcohol, and tributyl phosphate.

In an embodiment, in the step of using the extractant to extract the third solution B, the volume ratio of the extractant to the third solution B is 0.5-5:1.

In some specific embodiments, the organic extractant used in the above step of extraction can include a commonly-used extractant for metal ions, such as n-butanol, isoamyl alcohol, sulfonated kerosene, 260 solvent oil, 406 # environmentally friendly solvent oil, tributyl phosphate, methyl isobutyl ketone, etc. In a specific embodiment, the extractant used in step S50 is tributyl phosphate, and the proportion of tributyl phosphate in the mixed extractant is 1:0.5-2 (e.g., 1:1, etc.). The volume ratio of the added extractant to the third solution B is 0.5-5:1. The volume ratio of the added extractant to the third solution B may be 1-2:1.

In an embodiment, before back-extracting the extract phase, the method further comprises the steps of:

scrubbing the extract phase to obtain a solution containing metal ions;

and concentrating the solution containing the metal ions to obtain medium and trace element fertilizer products or as raw materials for fertilizer production.

In an embodiment, the method further comprises the steps of:

using the solution containing the metal ions to prepare nitrophosphate fertilizer.

In an embodiment, it further comprises that:

the acid used in the acid hydrolysis of the phosphate rock is at least partially derived from the nitric acid obtained from subjecting the second solution A or the second solution B to a denitrification by evaporation and concentration.

In an embodiment, the iron source comprises at least one of ferric salts, ferrous salts, or elemental iron, and the solution containing the sulfate ions is at least one of a sulfuric acid solution or a ammonium sulfate solution.

In an embodiment, the pH value of the reaction system is controlled between 4 and 6 during the reaction of the phosphoric acid solution with the iron source.

In an embodiment, the ammonia comprises at least one of ammonia gas, liquid ammonia, or aqueous ammonia.

The present disclosure also provides a ferric phosphate product prepared by the method for cogenerating ferric phosphate through the nitrophosphate fertilizer device according to the above method.

The present disclosure also provides a system for cogenerating ferric phosphate through a nitrophosphate fertilizer device, comprising:

an acid hydrolysis tank for an acid hydrolysis reaction of phosphate rock;

a first solid-liquid separation device for solid-liquid separating the acid-hydrolyzed slurry after acid hydrolysis to obtain an acid-hydrolyzed solution;

a freezing-crystallization device for freezing-crystallizing the acid-hydrolyzed solution;

a second solid-liquid separation device for solid-liquid separating the acid-hydrolyzed solution obtained from the freezing-crystallization device to obtain a first solution;

a decalcification reaction device for a decalcification reaction of the first solution with a solution containing sulfate ions;

a third solid-liquid separation device for solid-liquid separating product from the decalcification reaction to obtain a second solution;

a denitrification device for evaporating the second solution to remove nitrate ions, in order to obtain a concentrated and denitrated third solution and a nitric acid;

an extraction device for extracting the third solution with an extractant to obtain an extract phase;

a back-extraction device for back-extracting the extract phase to obtain phosphoric acid;

and/or, a neutralization device and a fourth solid-liquid separation device, wherein the neutralization device is configured for a neutralization reaction of the third solution with ammonium to obtain a neutralization reaction solution, and wherein the fourth solid-liquid separation device is configured for the solid-liquid separating the solution from the neutralization reaction to obtain an ammonium phosphate solution.

In an embodiment, the denitrification device is connected to the acid hydrolysis tank, allowing the nitric acid removed by the denitrification device to enter the acid hydrolysis tank.

In an embodiment, the first solid-liquid separation device and/or the second solid-liquid separation device and/or the third solid-liquid separation device and/or the fourth solid-liquid separation device is one of the a settling tank, a filter press, or a suction filter.

In an embodiment, the first solid-liquid separation device, the second solid-liquid separation device, the third solid-liquid separation device, and the fourth solid-liquid separation device are the same solid-liquid separation device that is in cycle use.

In an embodiment, the system further comprises:

a back-extraction device for back-extracting the extract phase from the extraction device.

In an embodiment, the system further comprises:

a scrubbing device, located between the extraction device and the back-extraction device, for scrubbing the extract phase from the extraction device to obtain a scrubbing solution containing metal ions;

a first concentration device for concentrating the scrubbing solution containing the metal ions to obtain a medium and trace element fertilizer product.

In an embodiment, the extraction device comprises one of a rotary disc extraction tower, a multi-stage centrifugal extraction tower, a vibrating sieve-plate tower, or a sieve-plate extraction tower.

In an embodiment, the system further comprises:

a second concentration device for concentrating the extract phase from the back-extraction device.

The above preparation method utilizes the nitrophosphate fertilizer device to prepare ferric phosphate, which is prepared from phosphate rock raw material to obtain high-purity ferric phosphate. The by-product of the preparation process can be directly used for fertilizer preparation or as an independent product, without waste. Moreover, the nitrophosphate fertilizer device is used to prepare ferric phosphate through two routes, namely the ammonium phosphate route and the phosphoric acid route, both of which utilize the nitrophosphate fertilizer device to prepare ferric phosphate. The two routes can be carried out separately or simultaneously. The by-product calcium sulfate has high quality and can satisfy the application of industrial calcium sulfate in building materials and other applications. The medium and trace metal ions in the by-product extract and the precipitate phosphate metal salts from neutralization can both be used as raw materials for fertilizer preparation and can be directly used for fertilizer preparation. The by-product nitric acid can be recycled for the acid hydrolysis of phosphate rock and can also be used for the preparation of an iron source, such as ferric nitrate or ferrous nitrate.

DETAILED DESCRIPTION

The implementation, functional features, and advantages of the present disclosure will be further explained in conjunction with the embodiments, with reference to the accompanying drawings. It should be understood that the specific embodiments described herein are only intended to explain the present disclosure and are not construed to limit the present disclosure.

An embodiment of the present disclosure provides a method for cogenerating ferric phosphate through a nitrophosphate fertilizer device. This method uses phosphate rock and an iron source as raw materials to prepare ferric phosphate.

In some embodiments, the phosphate rock or phosphate concentrate raw materials used for the preparation of ferric phosphate can be high-grade phosphate rock obtained by natural mining, and the phosphate concentrate is obtained by impurity removal or purification of medium-grade and low-grade phosphate rock.

Figure 1:
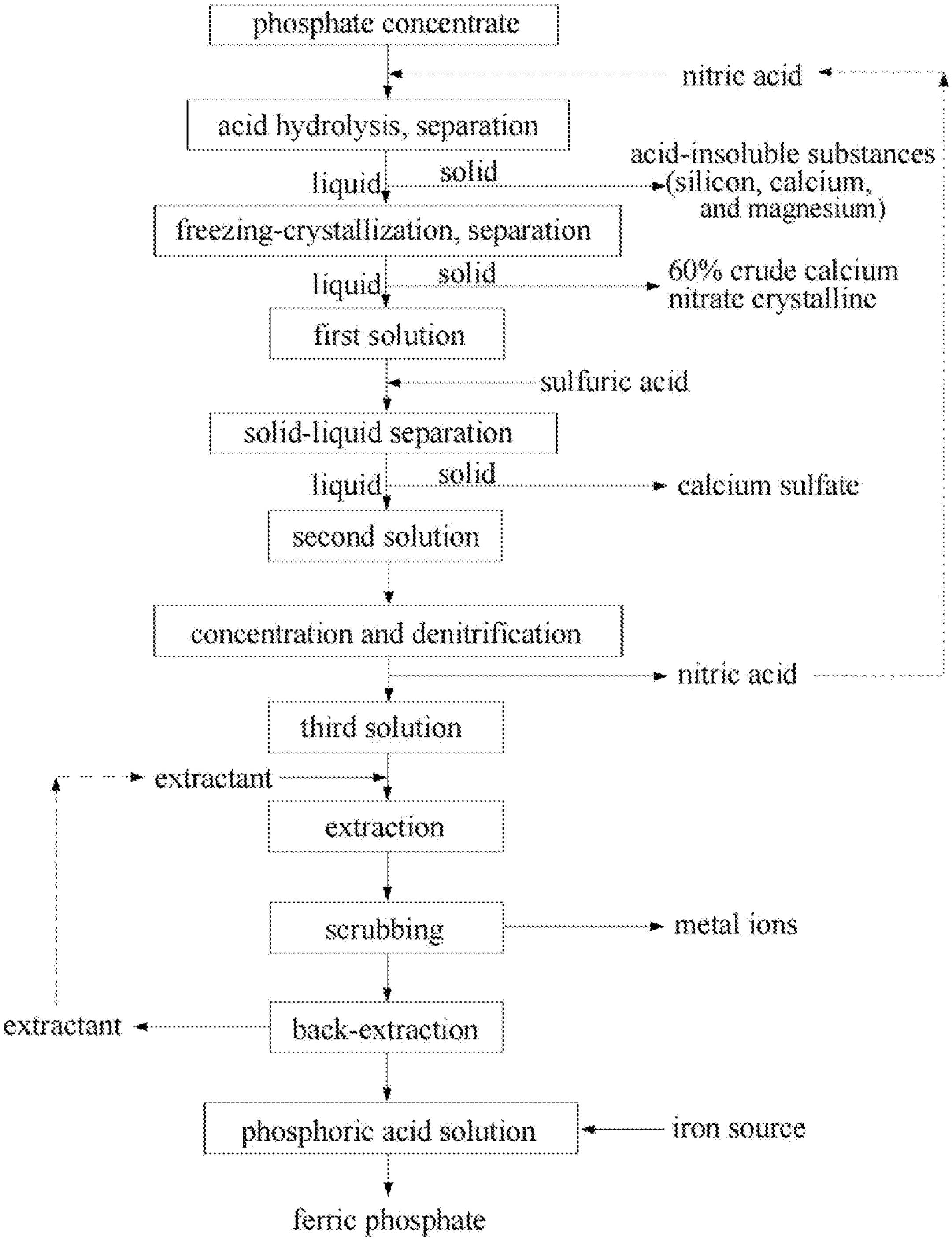
FIG. 1 is a schematic diagram of a method for cogenerating ferric phosphate through a nitrophosphate fertilizer device in an embodiment of the present disclosure.

Further, FIG. 1 shows a schematic diagram of a method for cogenerating ferric phosphate in an embodiment of the present disclosure, comprising the following steps of:

S10, acid-hydrolyzing phosphate rock or phosphate concentrate with a nitric acid or a mixed acid containing a nitric acid, and separating acid-insoluble substances to obtain an acid-hydrolyzed solution;

S20, freezing-crystallizing the acid-hydrolyzed solution to form calcium nitrate, and filtering out the crystalline calcium nitrate to obtain a first solution;

S30, adding a sulfuric acid solution to the first solution for further decalcification to obtain a second solution;

S40, concentrating the second solution to allow excess nitric acid to evaporate and escape from the second solution, thereby obtaining a concentrated and denitrated third solution;

S50, extracting the third solution obtained in step S40 to separate phosphoric acid and a portion of metal ions from the third solution into an extract phase; then, scrubbing the extract phase to remove the metal ions; and, back-extracting the scrubbed extract phase to obtain a phosphoric acid solution by returning the phosphoric acid from the organic extractant to an aqueous phase;

S60, reacting the phosphoric acid solution with an iron source to obtain a ferric phosphate.

In step S60, ferric phosphate is prepared by reacting the iron source with the phosphoric acid solution obtained in step S50. In some specific embodiments, the iron source comprises at least one of iron salts such as ferric sulfate, ferrous sulfate, ferric nitrate, ferrous nitrate, ferric chloride, or elemental iron such as iron powder and the like.

Figure 2:
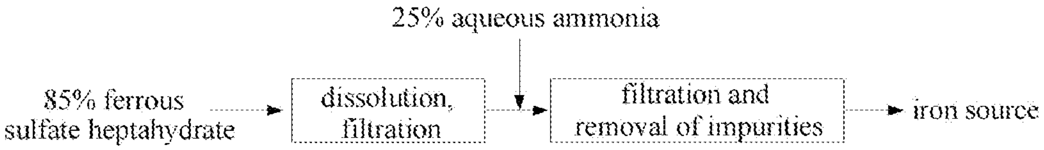
FIG. 2 is a schematic diagram of the preparation of an iron source in an embodiment of the present disclosure.

For example, in a specific embodiment shown in FIG. 2, the iron source is an iron salt solution obtained by dissolving the raw material of ferrous sulfate heptahydrate with a mass fraction of 85% and filtering, and then adding 25% aqueous ammonia followed by further filtering and removing impurities.

In a specific embodiment, the pH of the reaction system is controlled between 4 and 6 during the reaction of adding the iron source to the phosphoric acid solution obtained in step S50. On the one hand, precipitation of large amount of other metal impurities and insoluble ferrous phosphate is avoided when the pH of the reaction system is above 6. On the other hand, causing the ferric phosphate difficult to precipitate is avoided when the pH of the reaction system is below 4.

In a specific embodiment, the reaction product obtained from the reaction of the iron source with the phosphoric acid solution in step S60 is solid-liquid separated, and the obtained solid phase component is the ferric phosphate containing water of crystallization. Anhydrous ferric phosphate product with higher purity can be obtained by further drying and removing water of crystallization. The liquid phase component obtained by solid-liquid separating the product from the reaction of step S60 further contains phosphate ion, nitrate ion and other unprecipitated metal ions. In another embodiment, the method further comprises the step of:

preparing a nitrophosphate fertilizer by using the liquid phase component obtained by solid-liquid separating the product from step S60 as the raw material.

In some embodiments, the acid-hydrolyzed solution in step S10 is the liquid phase component obtained by directly filtering and separating the acid-hydrolyzed slurry. Alternatively, in some embodiments, the acid-hydrolyzed solution is obtained by merging the liquid phase component obtained by directly filtering and separating the acid-hydrolyzed slurry, and the scrubbing solution obtained by scrubbing the solid phase component of acid hydrolysis and separation with process water one or more times.

The acid-hydrolyzed solution of the phosphate concentrate mainly contains phosphate ions, metal impurities including, for example, calcium ions and the like, nitrate ions obtained from the acid hydrolysis by the nitric acid. In an embodiment, the amount of the added nitric acid during the process of acid hydrolysis can be relatively excessive to ensure complete reaction of the phosphate rock raw material.

In this embodiment, the acid-insoluble substances obtained from solid-liquid separation mainly contain acid-insoluble salts of silicon, calcium, and magnesium. In an embodiment, in order to effectively utilize the elements contained in the acid-insoluble substances, the acid-insoluble substances obtained from acid hydrolysis can be prepared into soil conditioner products for soil improvement.

In step S20, the acid-hydrolyzed solution is freezing-crystallized to form the calcium nitrate, and the crystalline calcium nitrate is filtered out to obtain a first solution. Specifically, in step S20, first, the acid-hydrolyzed solution is freezing-crystallized, during which a large amount of calcium ions and a portion of metal ions such as magnesium precipitate in the form of nitrate crystalline. For example, the acid-hydrolyzed solution is frozen to a temperature ranging from −10° C. to −5° C. (e.g., −8° C. to −5° C., etc.) and 60-85% of calcium nitrate precipitates in the form of $Ca(NO_3)_2 \cdot 4H_2O$ crystalline. Then, it is directly fed into a vacuum filter for filtration and separation, and the liquid phase component obtained after filtration is the first solution obtained.

Alternatively, in specific details of an embodiment, the solid phase component obtained after filtration and separation, such as the filter cake obtained through pressure filtration, is scrubbed with chilled nitric acid and chilled water. A portion of the generated scrubbing solution is used for system recycle and merged into the acid-hydrolyzed solution for further freezing-crystallization and separation. The other portion of the scrubbing solution is added to the acid hydrolysis tank for acid hydrolysis.

In step S30, the sulfuric acid solution is added to the first solution, causing the remaining calcium ions in the first solution to precipitate as slightly soluble or insoluble calcium sulfate, and then solid-liquid separation is carried out. The obtained solid phase component is calcium sulfate containing a certain amount of water, such as calcium sulfate hemihydrate, and the second solution with further calcium removal.

In an embodiment, the amount of the solution containing the sulfate ions is not excessive to avoid introducing sulfate impurities. That is to say, the molar amount of the sulfate ions in the added sulfuric acid solution should not exceed the molar amount of the calcium ions in the first solution to prevent the presence of the sulfate ions that affect the quality of phosphoric acid in the second solution after decalcification.

In an embodiment, the amount of the solution containing the sulfate ions is not excessive, and maintaining the concentration of the sulfate ions in the second solution below 0.5% after decalcification is beneficial for the subsequent removal of impurities. In another embodiment, the concentration of the sulfate ions in the second solution is maintained below 0.1% after decalcification. The concentration of the sulfate ions in the second solution may even be maintained below 0.01% after decalcification.

In step S40, the second solution is concentrated to allow the excess nitric acid to evaporate and escape from the second solution, thereby obtaining a concentrated and denitrated third solution.

In an embodiment, the evaporation temperature for evaporating and concentrating the second solution to remove the nitric acid is adjustable between 120° C. to 180° C. In another embodiment, the temperature for evaporation and concentration to remove nitric acid is 160° C. to 177° C. When the concentration of the nitrate ions in the system is below 0.5%, it is beneficial for the subsequent removal of metal impurities and the generation of phosphoric acid. In another embodiment, the concentration of the nitrate ions in the system is below 0.1% by evaporation and concentration. The concentration of the nitrate ions in the system may even be below 0.01% by evaporation and concentration.

In an embodiment, the concentration of the nitrate ions contained in the third solution obtained by evaporating and concentrating the second solution to remove nitric acid is below 0.5%. The concentration of the nitrate ions contained in the third solution may even be below 0.1%.

In an embodiment, the method further comprises the step of reabsorbing or recovering the nitric acid removed in step S40 for the acid hydrolysis of the phosphate rock raw material in step S10.

The third solution after concentration and removal of the nitric acid mainly comprises phosphoric acid, a portion of purities and metal ions.

In step S50, the third solution obtained in step S40 is extracted to separate the phosphoric acid and a portion of metal ions from the third solution into an extract phase. Then, the extract phase is scrubbed to remove the metal ions. After that, the scrubbed extract phase is back-extracted to obtain a phosphoric acid solution by returning the phosphoric acid from the organic extractant to the aqueous phase.

The terms "extraction" and "back-extraction" are both fundamental technical terms in the field of chemical engineering. Among them, the term "extraction" refers to the process of transferring solutes from one solvent to another by utilizing the differences in solubility or partition coefficients of substances in two immiscible (or slightly soluble) solvents. The "back-extraction" is the reverse process of "extraction", and refers to the process of solutes returning from the extractant.

In some specific embodiments, the organic extractant used in the above step of extraction can include a commonly-used extractant for metal ions, such as n-butanol, isoamyl alcohol, sulfonated kerosene, 260 solvent oil, 406 # environmentally friendly solvent oil, etc. In a specific embodiment, the extractant used in step S50 is a mixture of n-butanol and isoamyl alcohol. The ratio of n-butanol and isoamyl alcohol in the mixed extractant is 1:0.5-2 (e.g., the ratio of n-butanol and isoamyl alcohol is 1:1, etc.). The volume ratio of the added extractant to the third solution is 0.5-5:1.

Further, in another embodiment, decolor or concentrate the separated phosphoric acid solution after the step of back-extracting. On the one hand, the organic matter or fluorine element in the solution is further removed, and on the other hand, the appearance, color, and concentration of the product are improved to obtain a standardized product, i.e., an industrial phosphoric acid with a high-purity. In a specific embodiment, the mass percentage of $P_2O_5$ contained in the final phosphoric acid solution with a high-purity through decolorization and concentration is 61.58%.

On the other hand, in addition to obtaining the phosphoric acid through back-extraction, the extractant can also be recovered and purified to be recyclable.

In an embodiment, the above extraction is a multi-stage cross-flow extraction, so that the extraction efficiency is more sufficient.

The term "multi-stage cross-flow extraction" is a chemical term that refers to a method for carrying out multi-stage cross-flow extraction in a device with multiple stages connected in series, wherein each stage comprises an extraction chamber and a re-extraction chamber. In the extraction chamber, a donor phase is brought into contact with an extractant, which is re-extracted in contact with an acceptor phase in the re-extraction chamber. The extractant is conveyed in cross-flow to the donor phase and the acceptor phase within the same stage in a suitable manner, while the donor phase and the acceptor phase are conveyed through some or all of the stages in counter-current flow.

Figure 3:
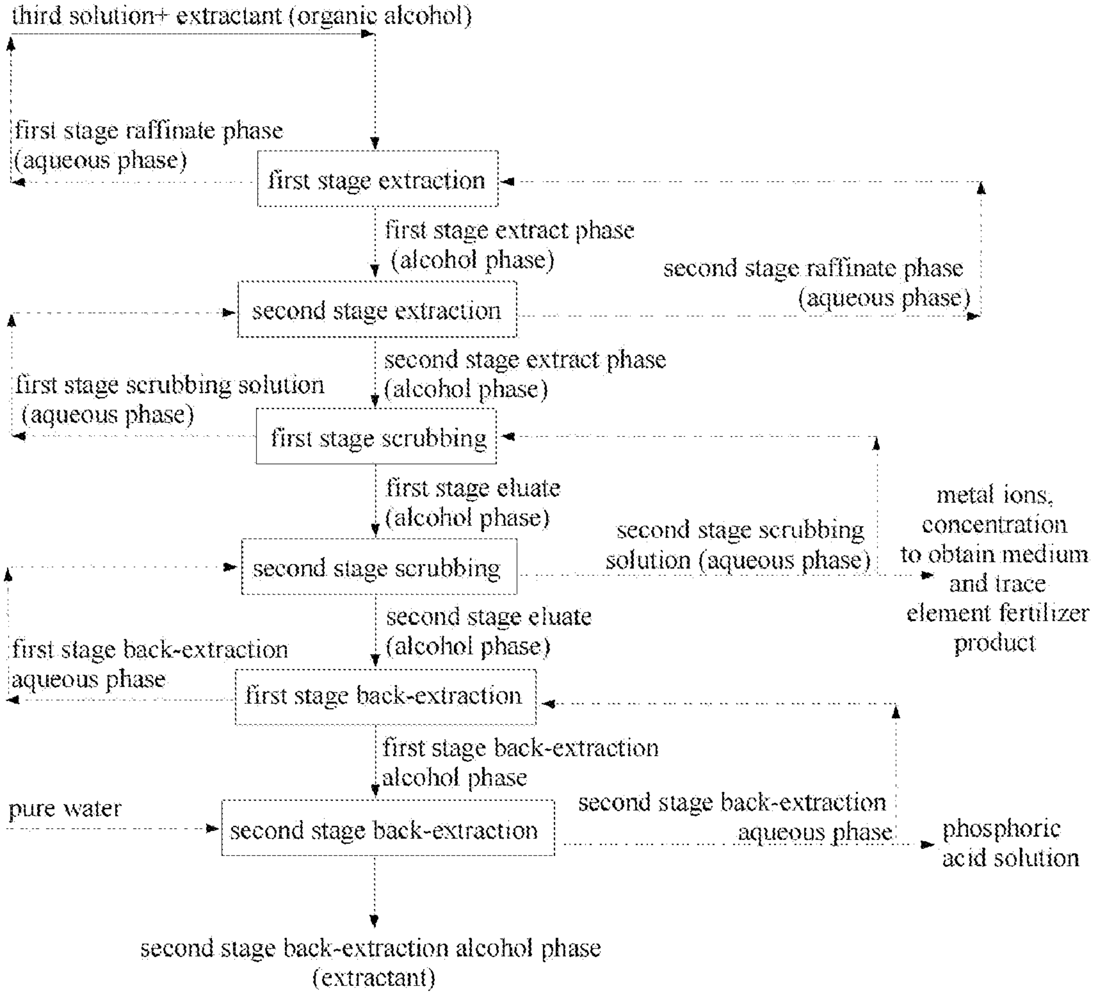
FIG. 3 is a schematic diagram of obtaining phosphoric acid through multi-stage cross-flow extraction, scrubbing, and back-extraction in an embodiment of the present disclosure.

For example, FIG. 3 shows a schematic diagram of multi-stage cross-flow extraction in a specific embodiment of the present disclosure. In this embodiment, multi-stage extraction, multi-stage scrubbing, and multiple back-extraction are used to improve the separation efficiency of the components in each step, thereby maximizing the purity of the final separated and prepared product.

In some specific embodiments, the scrubbing solution containing metal ion impurities contains medium and trace amount of metal elements such as calcium, magnesium, manganese and the like, which are added to phosphate fertilizers or fertilizer products to supplement medium and trace elements. Alternatively, the solution containing metal ion impurities can be concentrated and added to prepare an independent medium and trace element fertilizer product.

Figure 4:
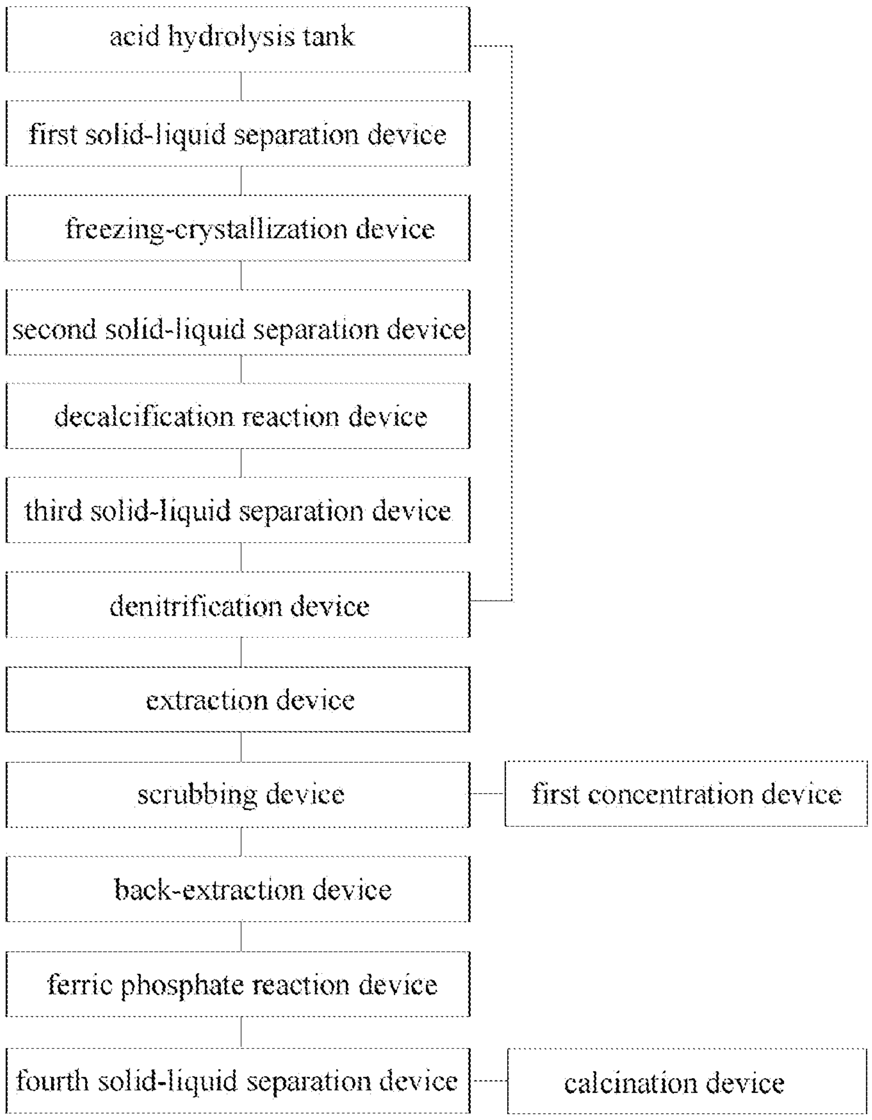
FIG. 4 is a schematic diagram of a system for cogenerating ferric phosphate through a nitrophosphate fertilizer device in an embodiment of the present disclosure.

Another embodiment of the present disclosure further provides a system for cogenerating industrial phosphoric acid through a nitrophosphate fertilizer device. In this embodiment, the system for cogenerating industrial phosphoric acid is shown in FIG. 4, comprising:

- an acid hydrolysis reaction device for an acid hydrolysis of phosphate rock raw material with a nitric acid or a mixed acid;
- a first solid-liquid separation device for solid-liquid separating the acid-hydrolyzed slurry after acid hydrolysis to obtain an acid-hydrolyzed solution;
- a freezing-crystallization device for freezing-crystallizing the acid-hydrolyzed solution;
- a second solid-liquid separation device for solid-liquid separating the acid-hydrolyzed solution from the freezing-crystallization device to obtain a first solution and a solid phrase of calcium nitrate crystalline hydrate;
- a decalcification reaction device for reacting the first solution with a nitric acid solution;
- a third solid-liquid separation device for solid-liquid separating the product from the decalcification reaction to obtain a second solution and a solid phrase of calcium sulfate;
- a denitrification device for concentration and denitrification of the second solution to obtain a concentrated and denitrated third solution and a nitric acid;
- an extraction device for extracting the third solution with an organic extractant to remove metal ions therein;
- a scrubbing device, located between the extraction device and a back-extraction device, for scrubbing the extract phase from the extraction device, wherein the scrubbing solution is merged with raffinate phase to obtain a phosphoric acid solution;
- the back-extraction device for back-extracting the organic extractant containing metal ions, i.e., the extract phase, to obtain a phosphoric acid solution;
- a ferric phosphate reaction device, for reacting the phosphoric acid solution with an iron source to generate ferric phosphate;
- a fourth solid-liquid separation device for solid-liquid separating the reaction product from the ferric phosphate reaction device, wherein the solid phase component is the ferric phosphate product containing water of crystallization;
- a denitrification device connected to the acid hydrolysis reaction device, allowing the nitric acid generated during evaporation and denitrification to enter the acid hydrolysis tank for acid hydrolysis.

Furthermore, the above system further comprises:

- a calcination device for calcining the solid phase component from the fourth solid-liquid separation device to obtain an anhydrous ferric phosphate product.

In some embodiments, the extraction device comprises one of a rotary disc extraction tower, a multi-stage centrifugal extraction tower, a vibrating sieve-plate tower, or a sieve-plate extraction tower.

In some embodiments, the first solid-liquid separation device, the second solid-liquid separation device, and the third solid-liquid separation device are independent separation devices or equipment from each other. Alternatively, in some embodiments, the first solid-liquid separation device, the second solid-liquid separation device, and the third solid-liquid separation device are separation devices or equipment shared in common, and the separation processes of the first solid-liquid separation device, the second solid-liquid separation device, and the third solid-liquid separation device are sequentially performed in different steps. In some specific embodiments, the first solid-liquid separation device, the second solid-liquid separation device, and the third solid-liquid separation device may include a settling tank, a filter press, a suction filter and the like.

The above system of the present disclosure partially utilizes and improves the existing system of nitrophosphate fertilizer to prepare ferric phosphate with a high-purity. The by-products of the preparation process can be directly used for fertilizer preparation or as independent products, without waste.

Figure 5:
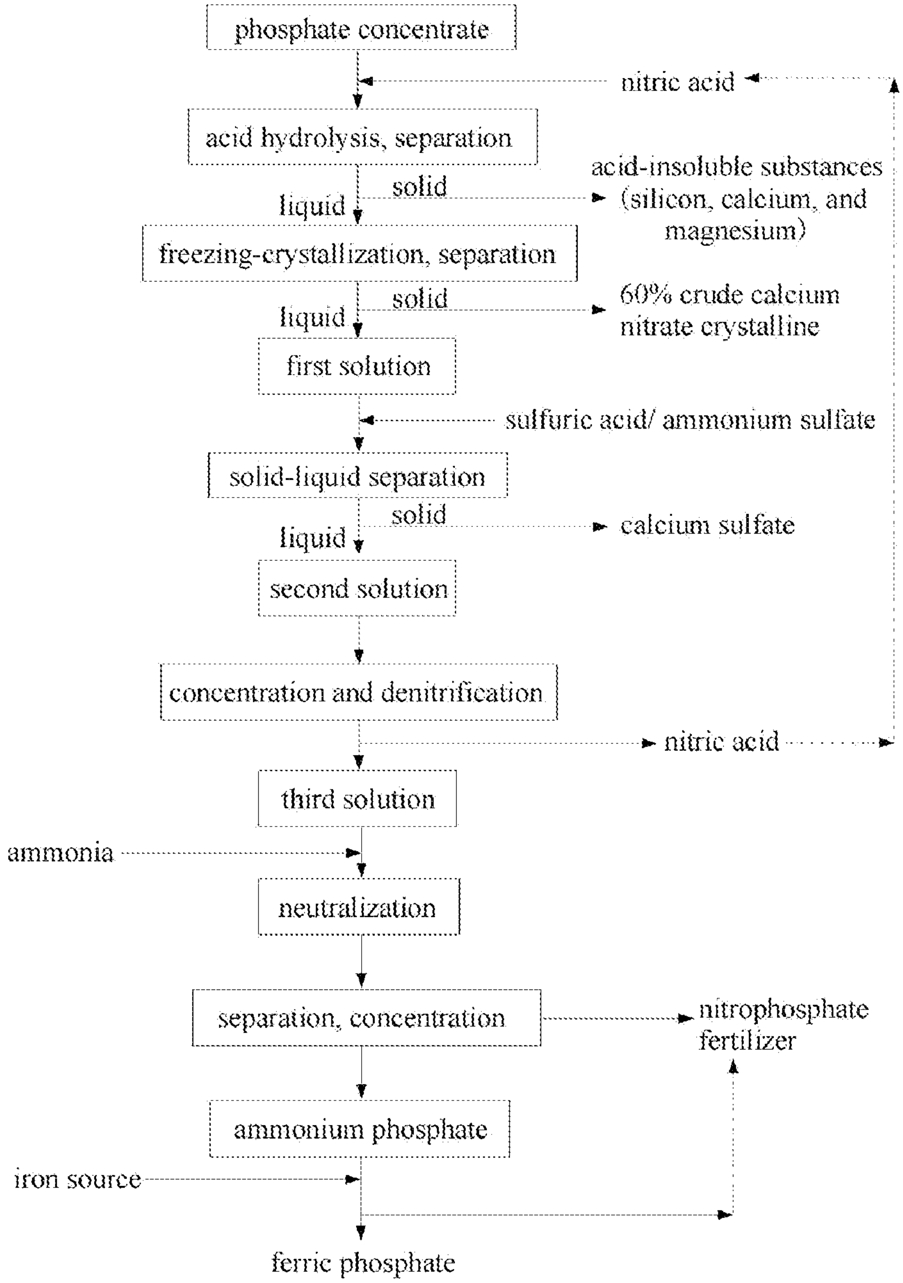
FIG. 5 is a schematic diagram of a method for cogenerating ferric phosphate in a nitrophosphate fertilizer device in another embodiment of the present disclosure.

The method for cogenerating ferric phosphate in another embodiment of the present disclosure is shown in FIG. 5, comprising the following steps of:

- S10, acid-hydrolyzing phosphate rock with a nitric acid or a mixed acid containing a nitric acid, and separating acid-insoluble substances to obtain an acid-hydrolyzed solution;

S20, freezing-crystallizing the acid-hydrolyzed solution to form calcium nitrate, and filtering out the crystalline calcium nitrate to obtain a first solution;

S30, adding a solution containing sulfuric ions to the first solution for further decalcification to obtain a second solution;

S40, concentrating the second solution to allow excess nitric acid to evaporate and escape from the second solution, thereby obtaining a concentrated and denitrated third solution;

S50, adding ammonia, such as ammonia gas, liquid ammonia, or aqueous ammonia and the like, to the third solution obtained in step S40 for neutralization reaction, and filtering to obtain an ammonium phosphate solution;

S60, adding an iron source to the ammonium phosphate solution obtained in step S50 for reaction, and solid-liquid separating to obtain a ferric phosphate product.

In step S60, ferric phosphate is prepared by reacting the iron source with the phosphoric acid solution obtained in step S50, wherein the iron source is at least one of iron salts such as ferric sulfate, ferrous sulfate, ferric nitrate, ferrous nitrate, ferric chloride, or elemental iron such as iron powder on the like.

Similarly, in the reaction process of step S60, the pH of the reaction system is controlled between 4 and 6.

In an embodiment, in step S50, the desired target product ammonium phosphate can be generated by adding ammonia for neutralization reaction. On the other hand, during the neutralization reaction, the pH of the system gradually increases, and a portion of metal ions such as calcium, magnesium, manganese and the like will form solid phase precipitation, which facilitates reducing impurities in ammonium phosphate product. After filtration and concentration, ammonium phosphate with a high-purity is obtained.

In another embodiment, the solid phase component filtered and separated in step S50 are mainly phosphates containing calcium, magnesium, and manganese, which are further used as elements of nitrophosphate fertilizer to prepare nitrophosphate fertilizer.

In another embodiment, in step S50, ammonia gas is introduced into the third solution for neutralization reaction until the pH of the system reaches 6 or above. When the pH of the system reaches 6 or above, impurity metal ions such as calcium, magnesium, manganese, etc. in the system will form precipitates in the form of phosphates, which is beneficial for reducing impurities and improving the purity of ammonium phosphate salts.

Furthermore, in some embodiments, in step S50, ammonia is added to the third solution to neutralize the pH of the reaction system. The pH of the neutralization reaction system is adjustable between 4 and 7 depending on the proportion or demand of ammonium dihydrogen phosphate, ammonium monohydrogen phosphate, and triammonium phosphate in the ammonium phosphate salt product to be prepared. By adjusting the pH range of the neutralization reaction system to different ranges, the proportions of ammonium dihydrogen phosphate, ammonium monohydrogen phosphate, and triammonium phosphate in the prepared product can be adjusted.

Figure 6:
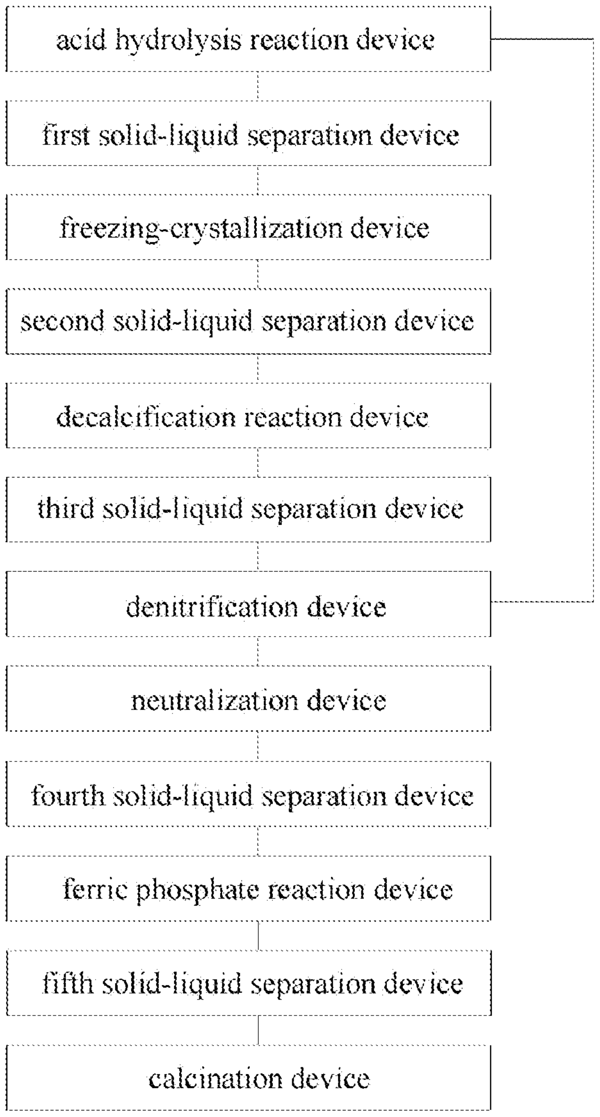
FIG. 6 is a schematic diagram of a system for cogenerating ferric phosphate through a nitrophosphate fertilizer device in another embodiment of the present disclosure.

Another embodiment of the present disclosure also proposes a system for cogenerating ferric phosphate, as shown in FIG. 6, comprising:

an acid hydrolysis reaction device for an acid hydrolysis of phosphate rock raw material with a nitric acid or a mixed acid;

a first solid-liquid separation device for solid-liquid separating the acid-hydrolyzed slurry after acid hydrolysis to obtain an acid-hydrolyzed solution;

a freezing-crystallization device for freezing-crystallizing the acid-hydrolyzed solution;

a second solid-liquid separation device for solid-liquid separating the acid-hydrolyzed solution from the freezing-crystallization device to obtain a first solution and a solid phrase of calcium nitrate crystalline hydrate;

a decalcification reaction device for reacting the first solution with a solution containing sulfate ion, such as sulfuric acid and ammonium sulfate;

a third solid-liquid separation device for solid-liquid separating the product from the decalcification reaction to obtain a second solution and a solid phrase of calcium sulfate;

a denitrification device for concentration and denitrification of the second solution to obtain a concentrated and denitrated third solution and a nitric acid;

a neutralization device for neutralization reaction of the third solution with ammonia;

a fourth solid-liquid separation device for filtering and separating the system from the neutralization reaction, wherein the liquid phase is an ammonium phosphate solution;

a ferric phosphate reaction device for reacting the phosphoric acid solution with an iron source to generate ferric phosphate;

a fifth solid-liquid separation device for solid-liquid separating the reaction product from the ferric phosphate reaction device, wherein the solid phase component is the ferric phosphate product containing water of crystallization;

a denitrification device connected to the acid hydrolysis reaction device, allowing the nitric acid generated during evaporation and denitrification to enter the acid hydrolysis tank for acid hydrolysis.

In some embodiments, the first solid-liquid separation device, the second solid-liquid separation device, the third solid-liquid separation device, the fourth solid-liquid separation device, and the fifth solid-liquid separation device are independent separation devices or equipment from each other. Alternatively, in some other embodiments, the first solid-liquid separation device, the second solid-liquid separation device, the third solid-liquid separation device, the fourth solid-liquid separation device, and the fifth solid-liquid separation device are separation devices or equipment shared in common, and the separation processes of the first solid-liquid separation device, the second solid-liquid separation device, the third solid-liquid separation device, the fourth solid-liquid separation device, and the fifth solid-liquid separation device are sequentially performed in different steps. In some specific embodiments, the first solid-liquid separation device, the second solid-liquid separation device, the third solid-liquid separation device, the fourth solid-liquid separation device, and the fifth solid-liquid separation device may include a settling tank, a filter press, a suction filter and the like.

In an embodiment, the denitrification device at least comprises: an accommodation chamber for receiving or accommodating the second solution, and a heater for heating and evaporating the second solution.

In another embodiment, the heater is a resistance heater which is configured to heat the second solution to 120° C. to 180° C. for evaporation during operation.

Furthermore, the above system further comprises:

a calcination device, which is used to calcine the solid phase component separated by the fifth solid-liquid separation device to obtain anhydrous ferric phosphate product.

To demonstrate the efficiency of preparing ferric phosphate product according to the present disclosure, the following Example 1 illustrates the material usage and yield of the preparation process in a specific embodiment, comprising the following:

S10, a mass of 2 t phosphate concentrate containing 34% $P_2O_5$ (also containing about 40.58% impurity calcium, 0.77% impurity magnesium, and a total of about 1-5% other impurities such as iron, aluminum, silicon, and fluorine) was acid-hydrolyzed with 2.4 t nitric acid of 100% consistency (0.53 tN). Then the acid-hydrolyzed slurry was solid-liquid separated to obtain 0.09 t acid-insoluble substances (containing silicon calcium magnesium raw materials) and an acid-hydrolyzed solution. The insoluble substances were scrubbed with water for 2-3 times, and the scrubbing solution was merged into the acid-hydrolyzed solution.

S20, the acid solution was frozen to a temperature of −10° C. to −5° C. for crystallization, and was then vacuum filtered at −2° C. to 1° C. to obtain 3.54 t 60% crude calcium nitrate crystalline and 2.186 t first solution (0.635 t $P_2O_5$).

S30, 0.349 t sulfuric acid was added to the first solution, which was deeply solid-liquid separated to obtain 0.51 t calcium sulfate hemihydrate and 2.055 t second solution (0.635 t $P_2O_5$).

S40, the second solution was evaporated and concentrated at 80° C. to 85° C. to remove nitric acid, until the concentration of the nitrate ions in the system is below 0.01%. The reaction was stopped, and 0.473 t nitric acid of 100% consistency was recovered and a third solution was obtained.

S50, the third solution was subjected to a multi-stage cross-flow extraction in an extraction tower by using an organic extractant (n-butanol and isoamyl alcohol mixed in a volume ration of 1:1) that is twice the volume of the third solution. Then the extract phase was scrubbed with water, and finally back-extracted using pure water, wherein the phosphoric acid solution is obtained by separation after back-extraction.

S60, an iron source was prepared by dissolving a mass of 2.3 t the purchased 85% ferrous sulfate heptahydrate in pure water, then filtering and removing impurities. Then 0.93 t 25% aqueous ammonia was added to the solution for neutralization, which was filtered again to remove impurities to obtain an iron salt solution.

The iron salt solution was reacted with the phosphoric acid solution obtained from back-extraction and separation in step S50, wherein the pH of the reaction system was controlled at 4-6. Then solid-liquid separation through pressure filtration was carried out after the completion of the reaction. The filtrate was concentrated and crystallized to obtain 0.66 t ammonium sulfate product, the solid phase filter cake obtained was 1.24 t ferric phosphate containing water of crystallization (including 0.48 t $P_2O_5$).

The ferric phosphate containing water of crystallization was further dried to obtain 1 t anhydrous ferric phosphate after removing the water of crystallization, wherein the content of $P_2O_5$ in anhydrous ferric phosphate was 48%, i.e., approximately 0.48 t $P_2O_5$.

S70, the liquid phase component obtained from solid-liquid separation in step S60 was concentrated and prepared as nitrophosphate fertilizer.

The following Example 2 illustrates the material usage and yield of the preparation process in a specific embodiment, comprising the following:

S10, a mass of 2 t phosphate concentrate containing 34% $P_2O_5$ was acid-hydrolyzed with 2.4 t nitric acid of 100% consistency (0.53 tN). Then the acid-hydrolyzed slurry was solid-liquid separated to obtain 0.09 t acid-insoluble substances (containing silicon calcium magnesium raw materials) and an acid-hydrolyzed solution. The—insoluble substances were scrubbed with water for 2-3 times, and the scrubbing solution was merged into the acid-hydrolyzed solution.

S20, the acid solution was frozen to a temperature of −10° C. to −5° C. for crystallization, and was then vacuum filtered at −2° C. to 1° C. to obtain 3.54 t 60% crude calcium nitrate crystalline and 2.186 t first solution (0.635 t $P_2O_5$). S30, adding 0.349 t sulfuric acid was added to the first solution, which was deeply solid-liquid separated to obtain 0.51 t calcium sulfate hemihydrate and 2.055 t second solution (0.635 t $P_2O_5$).

S40, the second solution was concentrated for denitrification. 0.473 t of 100% consistency nitric acid was recovered and a third solution was obtained.

S50, 0.19 t ammonia was gradually added to the third solution for neutralization reaction until the pH of the neutralization reaction system reaches 7.0. Separation and purification was carried out after the completion of the sedimentation, wherein the liquid phase component is ammonium phosphate solution.

S60, an iron source was prepared by dissolving a mass of 2.3 t the purchased 85% ferrous sulfate heptahydrate in pure water, then filtering and removing impurities. Then 0.93 t 25% aqueous ammonia was added to the solution for neutralization, which was filtered again to remove impurities to obtain an iron salt solution;

The iron salt solution was gradually added to the ammonium phosphate solution obtained from step S50, wherein the pH of the reaction system was controlled at 4-6. Then solid-liquid separation through pressure filtration was carried out after the completion of the reaction. The filtrate was concentrated and crystallized to obtain 0.66 t ammonium sulfate product. The solid phase filter cake obtained was 1.24 t ferric phosphate containing water of crystallization (containing 0.48 t $P_2O_5$), which was further subjected to calcination and removal of water of crystallization to obtain 1 t anhydrous ferric phosphate ferric phosphate product (containing 48% $P_2O_5$).

The above merely describes specific embodiments of the present disclosure and is not intended to limit the scope of protection of the present disclosure. Any variants of equivalent structure or equivalent process according to the description of the present disclosure, or direct or indirect application in other related technical fields, are all included in the scope of protection of the present disclosure.

What is claimed:

1. A method for cogenerating ferric phosphate through a nitrophosphate fertilizer device, comprising the following steps of:

acid-hydrolyzing phosphate rock or phosphate concentrate with a nitric acid, and separating acid-insoluble substances to obtain an acid-hydrolyzed solution;

freezing-crystallizing the acid-hydrolyzed solution, and then carrying out solid-liquid separation to obtain a first solution;

adding a solution containing sulfate ions to the first solution for reaction, and then carrying out solid-liquid separation to obtain a second solution A; and/or adding a sulfuric acid to the first solution for reaction, and then carrying out solid-liquid separation to obtain a second solution B;

subjecting the second solution A and/or the second solution B to a denitrification to obtain a third solution A and/or a third solution B;

adding ammonia to the third solution A for neutralization, and then carrying out solid-liquid separation to obtain an ammonium phosphate solution, and then adding an iron source to the ammonium phosphate solution for reaction to prepare ferric phosphate; and/or subjecting the third solution B to a pre-treatment and extraction by using an extractant to obtain an extract phase, and then subjecting the extract phase to a post-treatment and back-extraction to obtain a phosphoric acid solution, and then reacting the phosphoric acid solution with an iron source to obtain ferric phosphate.

2. The method for cogenerating ferric phosphate through the nitrophosphate fertilizer device according to claim 1, wherein the iron source comprises at least one of iron salts, ferrous salts, or elemental iron, and the solution containing sulfate ions is at least one of a sulfuric acid solution or an ammonium sulfate solution.

3. The method for cogenerating ferric phosphate through the nitrophosphate fertilizer device according to claim 1, wherein the pH value of the reaction system is controlled between 4 and 6 during the reaction of the iron source with the ammonium phosphate solution, and wherein the pH value of the reaction system is controlled between 4 and 6 during the reaction of the iron source with the phosphoric acid solution.

4. The method for cogenerating ferric phosphate through the nitrophosphate fertilizer device according to claim 1, wherein the concentration of the nitrate ions in the third solution A and the third solution B is below 0.1%.

5. The method for cogenerating ferric phosphate through the nitrophosphate fertilizer device according to claim 1, wherein in the step of subjecting the third solution B to the extraction by using the extractant, the volume ratio of the extractant to the third solution B is 0.5-5:1.

6. The method for cogenerating ferric phosphate through the nitrophosphate fertilizer device according to claim 1, wherein the ammonia comprises at least one of ammonia gas, liquid ammonia, or aqueous ammonia.

* * * * *